No. 876,628. PATENTED JAN. 14, 1908.
H. B. FULMER.
TURBINE ENGINE.
APPLICATION FILED APR. 18, 1907.
5 SHEETS—SHEET 1.
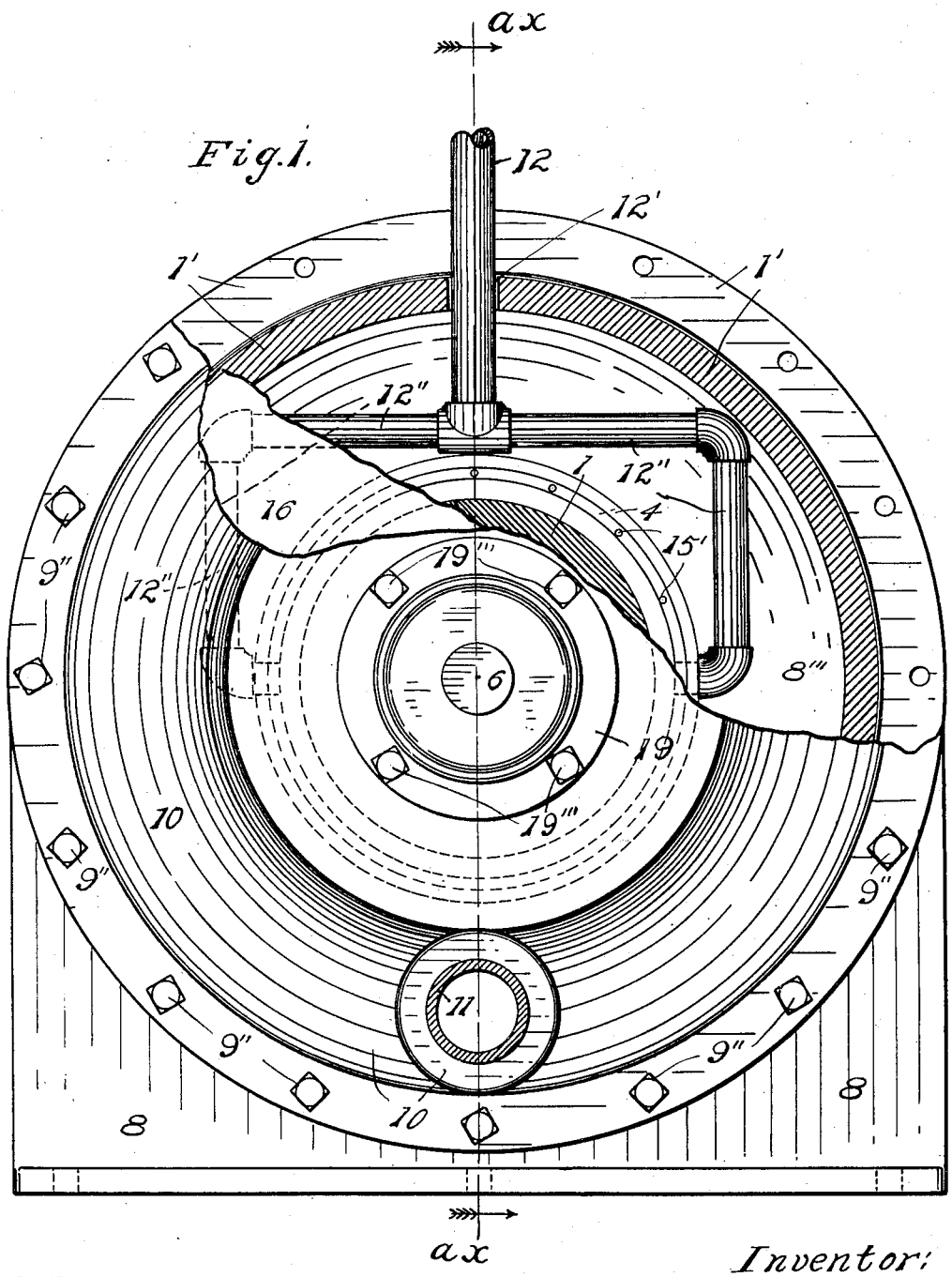

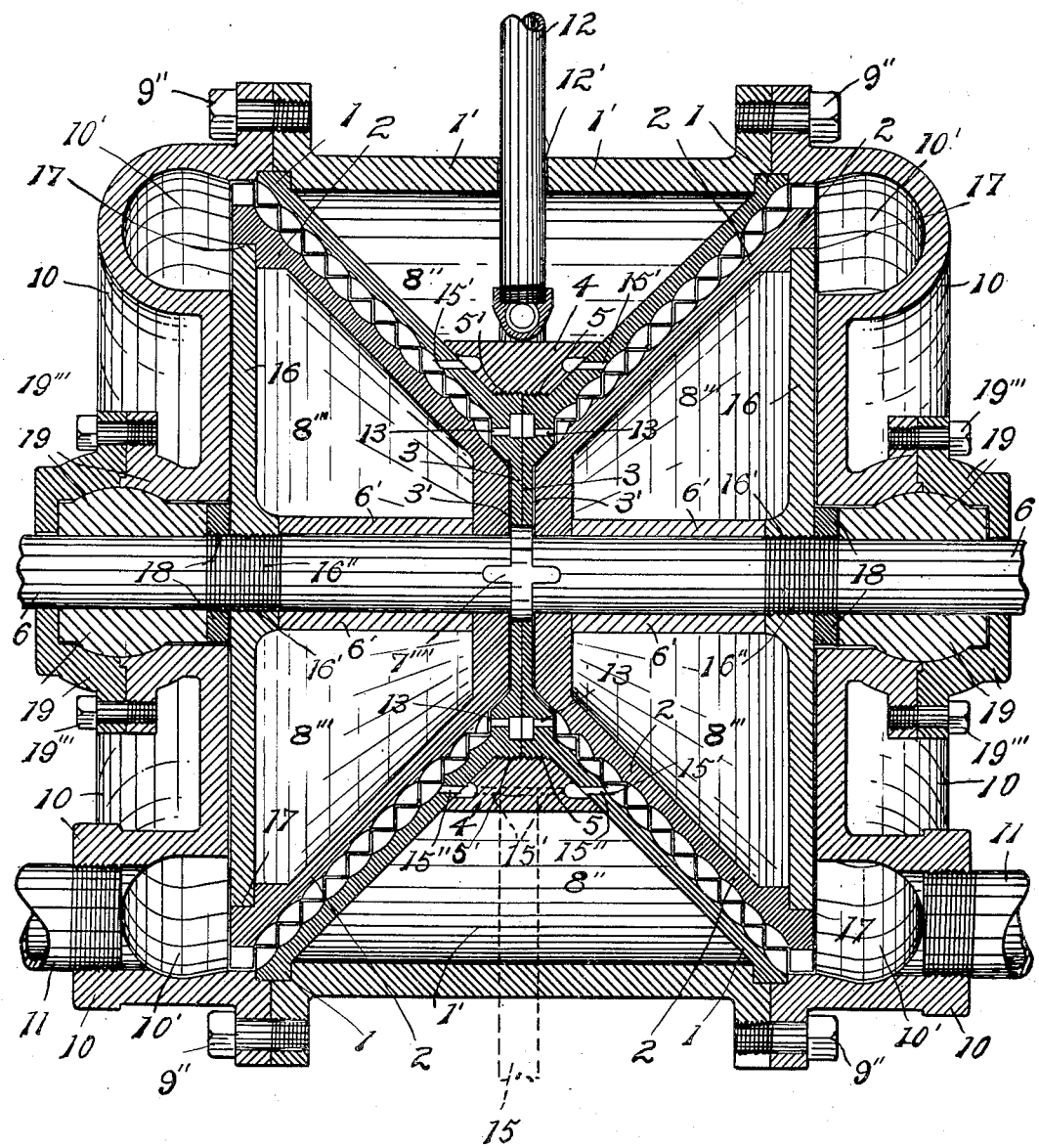

No. 876,628. PATENTED JAN. 14, 1908.
H. B. FULMER.
TURBINE ENGINE.
APPLICATION FILED APR. 18, 1907.
5 SHEETS—SHEET 3.
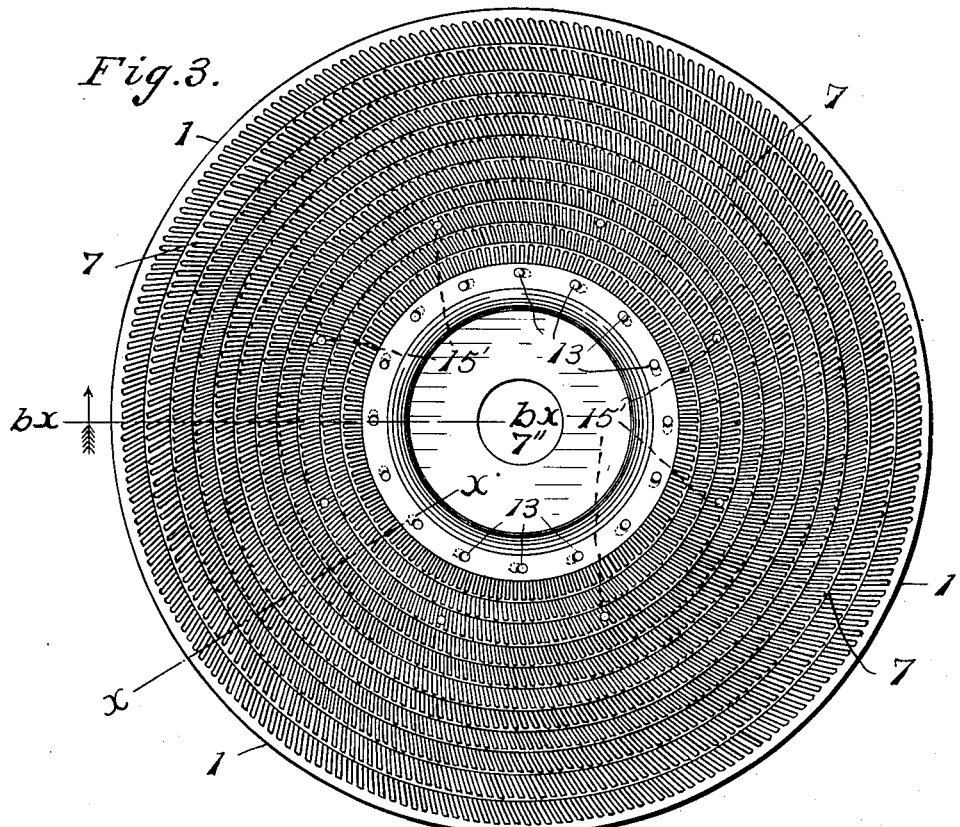
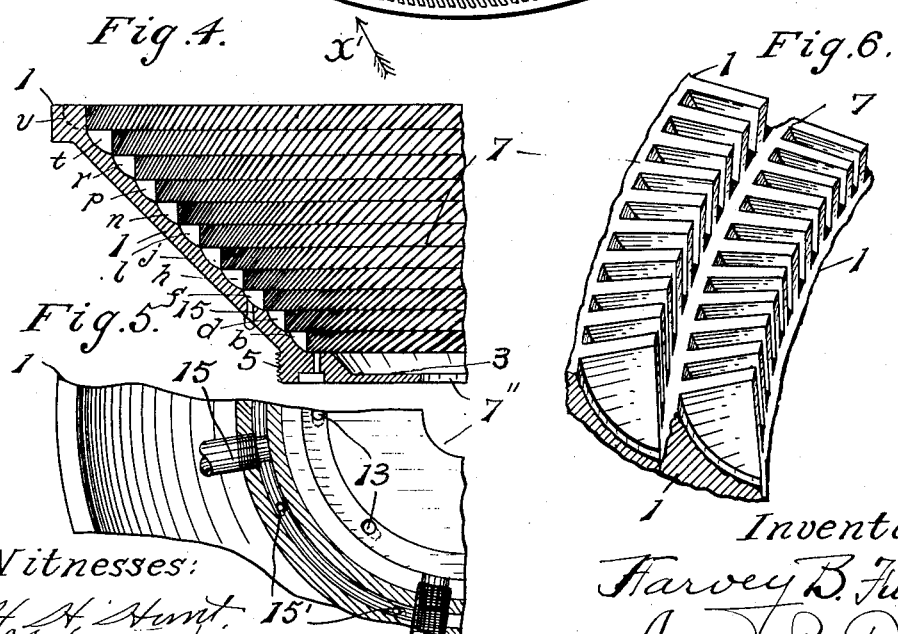
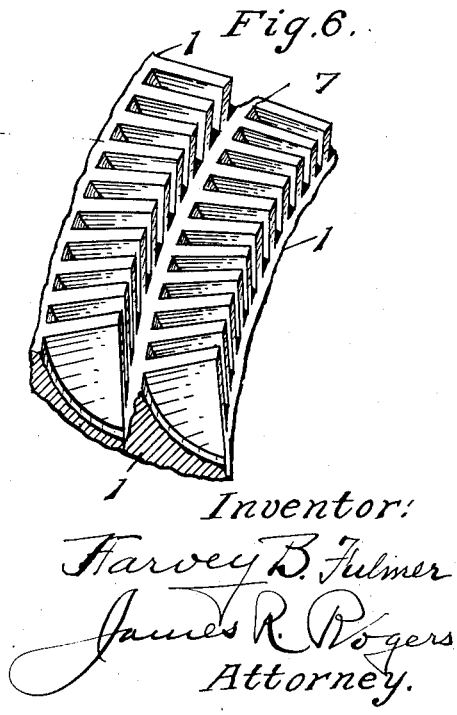
Witnesses:
Inventor:
Harvey B. Fulmer
James R. Rogers
Attorney.

No. 876,628.  
PATENTED JAN. 14, 1908.
H. B. FULMER.  
TURBINE ENGINE.  
APPLICATION FILED APR. 18, 1907.
5 SHEETS—SHEET 4.
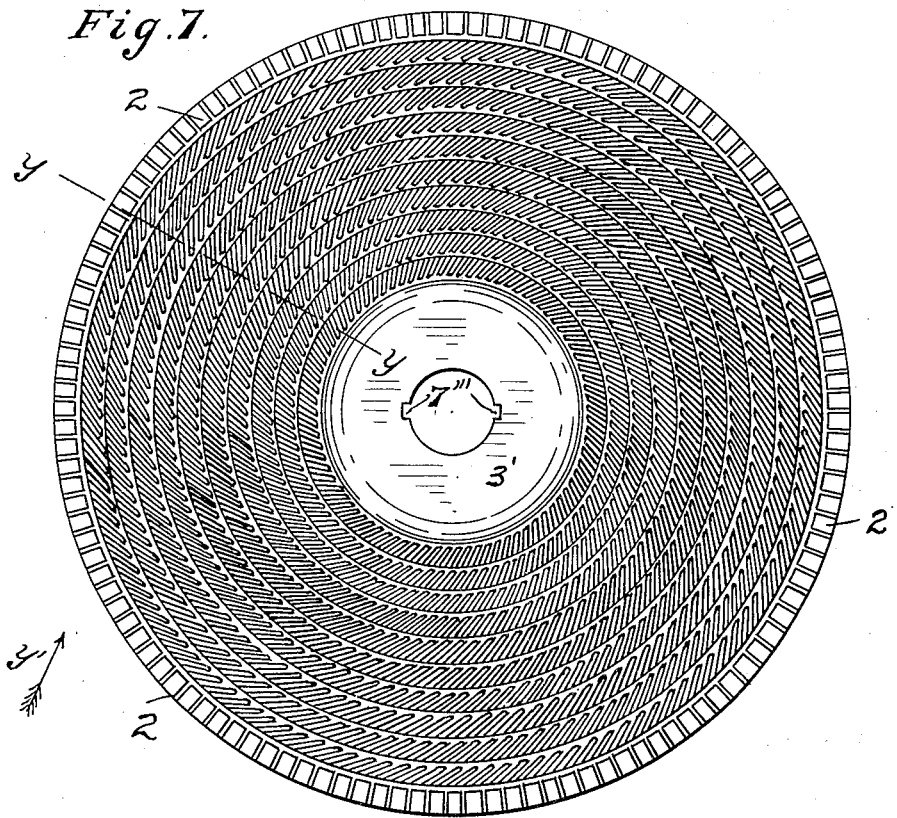
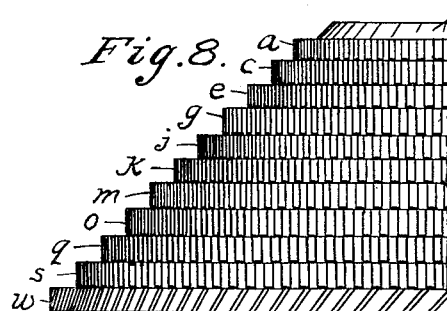
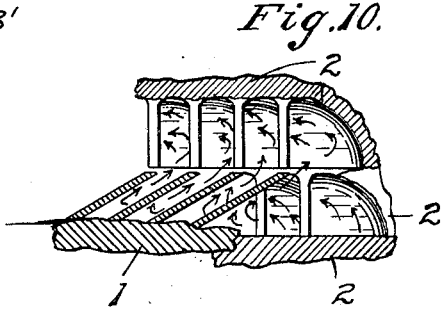
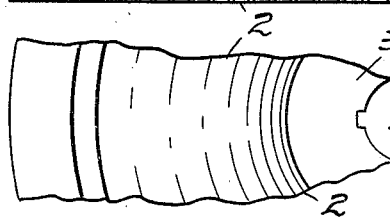
Witnesses:  
H. H. Hunt.  
J. H. Faust.
Inventor:  
Harvey B. Fulmer  
By James R. Rogers  
Attorney.

No. 876,628.

PATENTED JAN. 14, 1908.

H. B. FULMER.
TURBINE ENGINE.
APPLICATION FILED APR. 18, 1907.

5 SHEETS—SHEET 5.

Witnesses:

Inventor:
Harvey B. Fulmer
By James R. Rogers
Attorney

UNITED STATES PATENT OFFICE.

HARVEY B. FULMER, OF LOS ANGELES, CALIFORNIA.

TURBINE-ENGINE.

No. 876,628.  Specification of Letters Patent.  Patented Jan. 14, 1908.

Application filed April 18, 1907. Serial No. 369,006.

*To all whom it may concern:*

Be it known that I, HARVEY B. FULMER, a citizen of the United States, residing at Los Angeles, county of Los Angeles, State of California, have invented and discovered a new and useful Improvement in Impact and Reaction Turbine-Engines; and I do hereby declare the following to be a full, clear, and exact description of the invention, such as will enable others skilled in the art to which it appertains to make and use the same.

This invention relates to improvement in impact and reaction turbine engines; and the invention consists essentially in the construction, combination and arrangement of the several parts as will be hereinafter fully described in the specification, shown upon the drawings appended hereto and specifically pointed out in the claims made a part hereof. I attain these objects by the construction illustrated in the accompanying drawings, in which—

Figure 11:
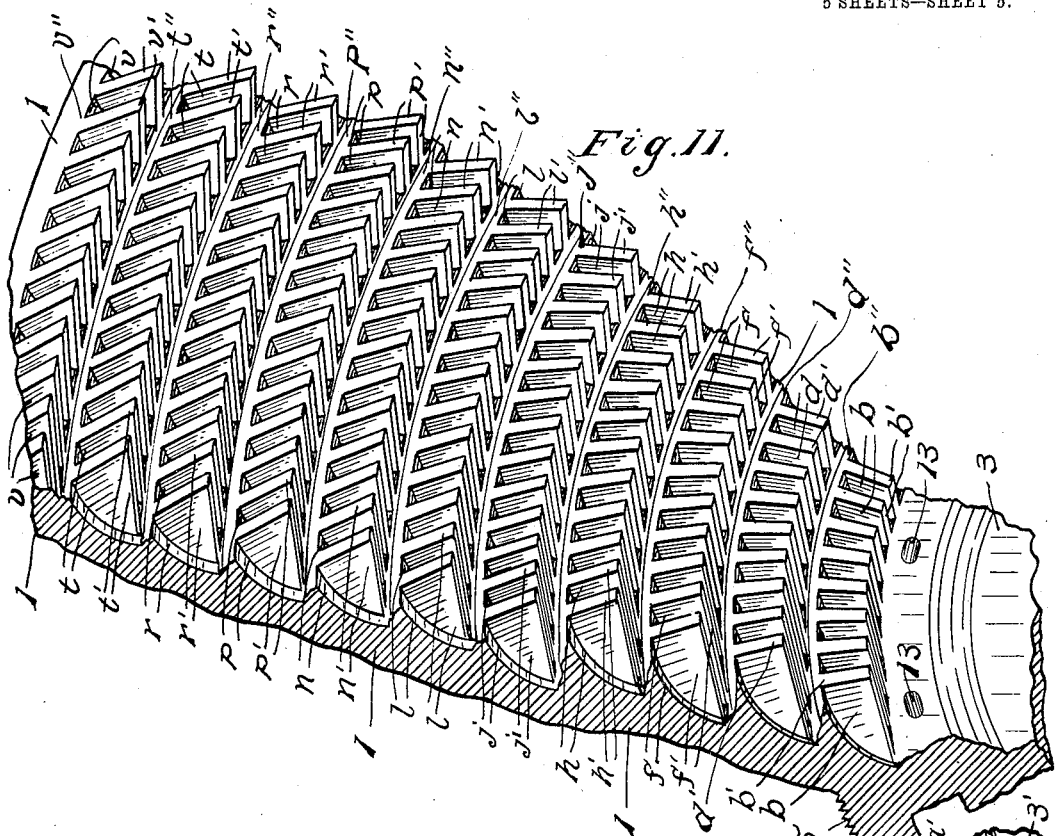
Figure 12:
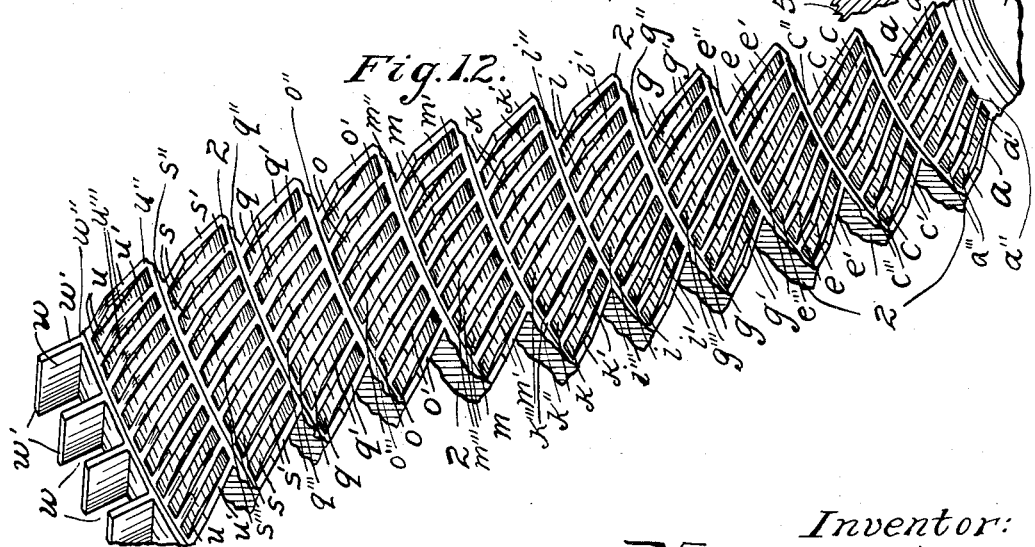

Figure 1 is a view in elevation of one end of my improved turbine engine, parts in section and portions thereof broken away; Fig. 2 is a longitudinal sectional view of my improvement taken on the line $a^\times$—$a^\times$ of Fig. 1, looking in the direction of the arrows; Fig. 3 is a plan view looking into the end of one of the stationary portions or bowls of my improved turbine, the rotary portions and other parts thereof removed; Fig. 4 is a sectional view of one of the stationary portions or bowls of the engine, taken upon the line $b^\times$—$b^\times$ of Fig. 3, looking in the direction of the arrow; Fig. 5 is a view of the outside portion of one of the stationary portions or bowls showing a part of the inlet pipe and ports, or openings, and the auxiliary pipe and ports through which the steam or elastic fluid enters into the engine, and portions thereof broken away; Fig. 6 is a perspective view of two series or rows of blades of one of the stationary portions of my improved engine; Fig. 7 is a plan view of one of the rotary portions or truncated cones of my improvement, the stationary portion and the shaft removed therefrom; Fig. 8 is a view in elevation of a portion of one of the rotary portions or truncated cones of my improved engine, parts thereof broken away; Fig. 9 is a fragmental view of a portion of the opposite surface of one of the rotary portions of my engine from that shown in Fig. 8; Fig. 10 are views, partly in section and partly in elevation, of portions of the stationary and rotary portions of my improvement, showing a series of blades in the stationary portion thereof, and two series or rows of pockets in the rotary portion thereof; Fig. 11 is a sectional view taken upon the line $x$—$x$ of Fig. 3, looking from the point of the arrow $x'$, shown upon said figure, illustrating a sector of the stationary portion of my improvement, parts thereof broken away; and Fig. 12 is a sectional view taken upon the line $y$—$y$ of Fig. 7, looking from the point of the arrow $y'$ shown upon said figure illustrating a sector of the rotary portion of my improved engine, parts thereof broken away.

Similar reference numerals, letters and characters refer to like parts throughout the several views of the drawings.

The stationary portions, or bowls, of my improved engine, I designate by the reference numerals 1, 1. The said portions are identical in construction and the description of one of said portions will serve as a description of the other.

The rotary portions or truncated cones of my improvement, I designate by the reference numerals 2, 2. The said two rotary portions are identical in construction and the description of one of them will serve as a description of the other. The said stationary and rotary portions are mounted upon suitable supports 8, 8, as shown upon Fig. 1 of the drawings. The said two stationary portions, or bowls, 1, and the said two rotary portions, or truncated cones 2, I desirably inclose within the circular and cylindrical casings lettered respectively 1' and 10, as illustrated upon Figs. 1 and 2 of the drawings, hereinafter to be more particularly described. The said stationary portions, I preferably construct in the form of a bowl, are truncated, as shown at 3, have receptacles 7, provided with central openings 7'', as illustrated upon Figs. 3, 4 and 5 of the drawings, through which openings 7'', the driving shaft 6 loosely extends and revolves therein, as shown upon Fig. 2 of the drawings.

The truncated ends 3 of the two bowls or stationary portions 1, as illustrated upon Fig. 2 of the drawings, abut, in close proximity to each other, and by means of the collar 4, illustrated upon Fig. 2 of the drawings, the said bowls are fastened together by means of the screw threads 5 upon the abutting portions of the stationary portions 1, and the interior screw threads 5' upon the inner surface of the collar 4. The said rotary portions or cones 2, truncated at 3', as illustrated upon Figs. 2, 7, 8 and 9 of the drawings, are provided with openings 7''', through which the driving shaft 6 passes and fastened therein by the key 7''''. The said rotary portions or cones are loosely fitted or seated centrally upon the inner surfaces of the stationary portions or bowls, as shown upon Fig. 2 of the drawings.

The outer surfaces of the rotary portions or cones 2, except the truncated portions thereof, upon their outer surfaces adjacent to the inner surfaces of the said stationary portions or bowls, are provided with a series of blades and pockets or buckets hereinafter more particularly referred to.

The two stationary portions or bowls are supported by the cylindrical casing 1', having an opening 12' therein, through which the pipe 12 passes, the said pipe adapted to convey steam or elastic fluid between the said stationary and rotary portions of the engine. The said pipe 12 has connected thereto the branch pipes 12'' shown in full and dotted lines upon Figs. 1 and 2 of the drawings, the said branch pipes adapted to convey the steam or elastic fluid through the ports 13 between the said inner surfaces of the stationary portions or bowls and the said outer surfaces of the rotary portions or cones, as illustrated upon Figs. 1 and 2 of the drawings.

The reference numeral 15 refers to the auxiliary pipe shown in full and dotted lines upon Figs. 2 and 5, for conveying steam or other elastic fluid through the ports 15' in the collar 4, thence through the ports 15'' in the bowls 1, between the said inner surfaces of the stationary portions or bowls and the said outer surfaces of the rotary portions or cones, when desired. The said cylindrical casing hereinbefore referred to is fastened to the circular casing 10 by means of the screw threaded bolts 9''. The said circular casing has connected thereto the exhaust pipe 11, which conveys the exhausted steam or elastic fluid from the engine.

The reference numerals 16, indicate the circular plates having the central screw threaded openings 16' therein, in which the driving shaft 6, screw threaded at 16'' is securely fastened, the said plates upon the periphery thereof form supports for the outer rim of the rotary portions or cones 2, as shown at 17, upon Fig. 2 of the drawings. The said plates 16 with the plain surfaces of the cones 2, form the chambers 8''', as illustrated upon the last mentioned figure of the drawings. In like manner, the inner surfaces of the said cylindrical casings 1' with the plain surfaces of the bowls form the chambers 8'', and support the outer rims of the said bowls as hereinbefore referred to. I surround the shaft 6, within the chamber 8''' by means of sleeves 6', as shown upon Fig. 2 of the drawings.

Upon the screw threaded portions 16'', of the shaft 6, bearing upon the outside of the central circular plates 16, I secure the screw threaded nuts 18, and the said shaft extends outwardly from the said nuts through the box bearings 19, the said box bearings 19 being secured to the said circular casing 10 by means of the screw threaded bolts 19'''.

The steam or elastic fluid surfaces of the stationary portions or bowls 1, are provided with a series of circular steps $b''$, $d''$, $f''$, $h''$, $j''$, $l''$, $n''$, $p''$, $r''$, $t''$ and $v''$, as shown upon Fig. 11 of the drawings. The said series of circular steps extend entirely around the inner surface of the bowls, each one being equidistant at any given point thereof, from the central opening 7'', as shown upon Figs. 2, 3 and 4 of the drawings. Upon the said stationary portions, or bowls, the said series of steps, hereinbefore mentioned by letters of reference, are provided with a series of channels, $b$, $d$, $f$, $h$, $j$, $n$, $p$, $r$, $t$, and $v$, increasing in depth from channels $b$ in step $b''$, as shown upon Figs. 4 and 11 of the drawings, to the channels $v$ in step $v''$, where the steam or elastic fluid employed, first enters the surface of the said stationary portions, or bowls, to the channels in the step $v''$ where the steam or elastic fluid leaves the surface of the said stationary portions, or bowls, before passing into the steam passage way 10' of the circular casing 10, thence into the exhaust pipe 11, shown upon Fig. 2 of the drawings. The said channels hereinbefore mentioned are cut into the body of the said stationary portions, or bowls, at angles that decrease in dimensions from those in step $b''$, to the angles in step $v''$, from which the steam or elastic fluid passes from the said stationary portions, or bowls, into the channel $v$ of the rotary portion, thence into the steam passage way 10', and out of the engine through the exhaust pipe 11, as shown upon Fig. 2. Each of the said channels hereinbefore designated by letter of reference, is limited on the sides thereof by two angular blades $b'$, $d'$, $f'$, $h'$, $j'$, $l'$, $n'$, $p'$, $r'$, $t'$ and $v'$. The said angular blades upon the steam or elastic fluid surfaces of the said stationary portions, or bowls, have each an angle decreasing in dimension, beginning with those of step $b''$, through the whole series of steps, to the said angular blades $v'$ of the step $v''$, upon the outer border or rim of the said stationary portions or bowls.

The steam or elastic fluid surfaces of the rotary portions or cones 2, are provided with a series of circular steps $a''$, $c''$, $e''$, $g''$, $i''$, $k''$, $m''$, $o''$, $q''$, $s''$, $u''$ and $w''$, as shown upon Fig. 12 of the drawings. The said series of circular steps extend entirely around the outer surfaces of said rotary portions, or cones 2, each one being equi-distant at any given point thereof from the central opening 7''', in which the shaft 6 is keyed, as shown upon Figs. 2, 7 and 8 of the drawings. Upon the said rotary portions, or cones 2, the said series of steps hereinbefore mentioned by letters of reference, have herein a series of channels, or pockets, $a, c, e, g, i, k,$ $m, o, q, s, u$ and $w$, increasing in depth from the channel $a$ in step $a''$, where the steam or elastic fluid employed, enters through the ports 13 and strikes the surface of the said channels or pockets of the rotary portions or cones, to the channels or pockets $w$ in the step $w'''$, where the steam or elastic fluid leaves the surface of said rotary portions or cones, passing into the steam passage ways 10' of the circular casing 10, thence into the exhaust pipe 11, as shown upon Fig 2 of the drawings. The said channels, or pockets, hereinbefore mentioned, are cut into the body of the said rotary portions or cones, at angles increasing in dimensions from the said step $a''$ to those shown in step $w''$, from which the steam or elastic fluid passes from the said rotary portions or cones, into the steam passage way 10' out of the engine through the exhaust pipe 11, as shown upon Fig. 2 of the drawings.

Each of the channels or pockets, hereinbefore designated by letters of reference, is limited on the sides thereof by two angular blades $a', c', e', g', i', k', m', o', q', s', u'$ and $w'$ and by the curved closed end $a''', c''', e''', g''', i''', k''', m''', o''', q''', s''', u''',$ and $w'''$ of the body of the cones 2. The said angular blades upon the steam or elastic fluid surfaces of the said rotary portions or cones 2, made integral with said portions or cones, have each an angle increasing in dimension, beginning with those of step $a''$, through the whole series of steps to the said blades of the step $w''$, upon the outer border or rim of the said rotary portions or cones.

The operation of this invention will be readily understood from the foregoing description, taken in connection with the drawings appended hereto.

It is obvious that many and various changes in the details of construction and arrangement of my invention would readily suggest themselves to persons skilled in the art and still be within the spirit and scope of my invention.

From the foregoing description, taken in connection with the accompanying drawings, it is thought that the construction and advantages of the invention will be readily apparent without requiring an extended explanation.

Changes in the form, proportion and minor details of construction may be resorted to without departing from the principle or sacrificing any of the advantages of this invention, and I therefore reserve to myself the right to make such changes as fairly fall within the scope thereof.

I claim:

1. An engine comprising a stationary and a revolving portion, the said stationary portion having channels forming an integral part thereof, increasing in depth from the point where the steam or elastic fluid is admitted to the outer circumference thereof, where the steam or elastic fluid is exhausted therefrom, a rotary portion having channels made integrally therewith, having angles increasing from the point of admission of the steam or elastic fluid to the outer circumference thereof, where the steam or elastic fluid is exhausted from the engine.

2. In turbine engines, having a stationary portion, means for supporting the same, and a revolving truncated cone portion and means for supporting and rotating the said truncated cone within the stationary portion or bowl, the said revolving portion provided with blades forming angles increasing from the inner to the outer portions thereof.

3. In engines comprising stationary and rotary portions, one adapted to revolve within the other, the said stationary and rotary portions having steps upon their adjacent surfaces and a series of rows of angular blades and channels in said steps made integral with said portions, and means for the inlet and outlet of steam or elastic fluid between the revolving surfaces of said portions.

4. Turbine engines provided with stationary and revolving portions, means for supporting the same and for revolving one within the other, the said portions being provided with rows of angular blades and channels made integral with said portions, the said blades and channels of the two portions being arranged at opposing angles, means for admitting steam or other elastic fluid between the adjacent surfaces of said portions, and means for conveying the exhausted steam or fluid from between said portions.

5. In a turbine engine, a pair of stationary bowls, a pair of rotary cones, each cone being nested with its respective bowl, the adjacent surfaces of each nested bowl and cone having circular steps with oblique channels cut therein, the depth of said channels increasing in each succeeding step toward the outer steps.

6. In a turbine engine, a pair of stationary bowls, a pair of rotary cones, each cone being nested with its respective bowl, the adjacent surfaces of each nested bowl and cone having circular steps with oblique channels cut therein, the depth of said channels increasing in each succeeding step toward the outer steps, the obliquity in the bowls decreasing toward the outer step, the obliquity of channels in the cones increasing toward the outer step.

7. In a turbine engine, a pair of stationary bowls, a pair of rotary cones, each cone being nested with its respective bowl, the adjacent surfaces of each nested bowl and cone having circular steps with oblique channels cut therein, the obliquity of the channels in the bowls decreasing toward the outer step, and the obliquity of the channels in the cones increasing toward the outer step.

8. In a turbine engine, a stationary bowl, a rotary cone nested therewith, the adjacent surfaces of the cone and bowl having circular steps with oblique channels cut therein, the depth of said channels increasing in each succeeding step toward the outer steps.

9. In a turbine engine, a stationary bowl, a rotary cone nested therewith, the adjacent surfaces of the cone and bowl having circular steps with oblique channels cut therein, the depth of said channels increasing in each succeeding step toward the outer steps, the obliquity of channels in the bowls decreasing toward the outer step, the obliquity of channels in the cones increasing toward the outer step.

10. In a turbine engine, a stationary bowl, a rotary cone nested therewith, the adjacent surfaces of the cone and bowl having circular steps with oblique channels cut therein, the obliquity of the channels in the bowls decreasing toward the outer step, and the obliquity of the channels in the cones increasing toward the outer step.

11. In a turbine engine, a stator with a conical recess formed with annular steps, a conical rotor with annular steps fitting within the stator with a slight clearance between the steps of the rotor and steps of the stator, the steps of the rotor and stator having channels cut therein.

12. In a turbine engine, a stationary bowl with internal steps, a rotary cone with external steps nested with the bowl, the steps of both bowl and cone having oblique channels with curved bottoms cut therein.

13. In a turbine engine, a pair of stationary bowls, a pair of rotary cones, each cone being nested with its respective bowl, the adjacent surfaces of each nested bowl and cone having circular steps with oblique channels cut therein, the depth of said channels increasing in each succeeding step toward the outer steps, the obilquity of channels in the bowls decreasing toward the outer step, the obliquity of channels in the cones increasing toward the outer step, the channels of both bowls and cones having curved bottoms.

14. In a turbine engine, a pair of bowls having flanges at their inner ends, the flanges being secured together, rotatable truncated cones nested in the respective bowls, the truncated ends of the cones bearing against said flanges, the cones and bowls having recesses cut therein forming blades on the respective adjacent surfaces of the cones and bowls.

15. In a turbine engine, a pair of bowls having flanges at their inner ends, the flanges being secured together, rotatable truncated cones nested in the respective bowls, the truncated ends of the cones bearing against said flanges, the cones and bowls having recesses cut therein forming blades in the respective adjacent surfaces of the cones and bowls, a shaft extending through the center of the bowls and cones to which the cones are fixed, and a collar on said shaft between the truncated ends of the cones.

16. In a turbine engine, a pair of bowls having flanges at their inner ends, the flanges being secured together, rotatable truncated cones nested in the respective bowls, the truncated ends of the cones bearing against said flanges, the cones and bowls having recesses cut therein forming blades on the respective adjacent surfaces of the cones and bowls, the abutting ends of the bowls having an annular chamber with a series of laterally directed parts extending from each side thereof for discharging the elastic fluid to the respective inner rows of blades.

17. In a turbine engine, a pair of stationary conical bowls with externally threaded shoulders on their inner abutting ends, an internally threaded ring into which said threaded shoulders are screwed, rotatable cones nesting with the bowls, the bowls and cones having oblique recesses forming blades.

In testimony whereof, I have signed my name to this specification in the presence of two subscribing witnesses.

HARVEY B. FULMER.

Witnesses:
JAMES R. ROGERS,
W. H. FAUST.